United States Patent [19]

Coffy

[11] Patent Number: 5,204,420
[45] Date of Patent: Apr. 20, 1993

US005204420A

[54] GRIGNARD REAGENT AS ACTIVATOR FOR POLYMERIZATION OF DICYCLOPENTADIENE

[75] Inventor: Tim J. Coffy, Newark, Del.

[73] Assignee: Hercules Incorporated, Wilmington, Del.

[21] Appl. No.: 814,987

[22] Filed: Dec. 23, 1991

[51] Int. Cl.$^5$ .................... C08F 4/50; C08G 61/08
[52] U.S. Cl. ................... 526/162; 526/142; 526/169; 526/183; 526/283; 502/103; 264/328.6
[58] Field of Search .............. 526/169, 283, 162, 183; 264/328.6; 502/103, 112

[56] References Cited

U.S. PATENT DOCUMENTS

| | | | |
|---|---|---|---|
| 3,114,719 | 12/1963 | Aries | 252/430 |
| 4,080,491 | 3/1978 | Kobayashi et al. | 526/169 X |
| 4,357,449 | 11/1982 | Yi | 526/169 X |
| 4,380,617 | 4/1983 | Minchak et al. | 526/161 |
| 4,861,848 | 8/1989 | Basset et al. | 526/169 |

OTHER PUBLICATIONS

Levisalles et al., *Journal of Organometallic Chemistry*, 192 (1980) 375-384 "Studies of the Mechanism of Olefin Metathesis II. Cleavage of Alkyl-Tungstens; Abnormal Inductions" (translation).

Levisalles et al., *Journal of Organometallic Chemistry*, 193 (1980) 235-236 "Studies of the Mechanism of Olefin Metathesis IV. Exchange of Hydrides and Carbenes" (translation).

Raven et al., "The Utility of Grignard Reagents as Co-catalysts in homogeneous -Olefin Disproportionation", *Chemistry and Industry*, 1 Apr. 1973.

Takagi et al., *J.C.S. Chem. Comm.*, p. 838, 1972, "Disproportionation of Hept-2-ene by a Homogeneous Tungsten Hexachloride-Grignard Reagent Catalyst" (abstract).

Takagi et al., *Journal of the Oil Chemists' Society, Japan*, 24 (8), pp. 518-521 (1975), "Use of Unsolvated Grignard Reagents as Cocatalysts in Homogeneous System Olefin Metathesis" (translation).

*Primary Examiner*—Fred Teskin
*Attorney, Agent, or Firm*—Joanne W. Patterson

[57] ABSTRACT

A Grignard reagent having the formula RMgX where R is a cycloalkyl or cycloalkenyl group and X is Cl, Br or I, is used as the catalyst activator for the metathesis polymerization of dicyclopentadiene and other polycyclic cycloolefins.

5 Claims, No Drawings

GRIGNARD REAGENT AS ACTIVATOR FOR POLYMERIZATION OF DICYCLOPENTADIENE

FIELD OF THE INVENTION

This invention relates to an activator for a metathesis catalyst system used in the polymerization of dicyclopentadiene and other polycyclic cycloolefins.

BACKGROUND OF THE INVENTION

The preparation of thermoset cycloolefin polymers such as dicyclopentadiene (DCPD) using metathesis catalysts is described in Klosiewicz, U.S. Pat. Nos. 4,400,340 and 4,520,181. A two-stream reaction injection molding process is used in which a first stream, including the catalyst, and a second stream, including a catalyst activator, are combined in a mix head and immediately injected into a mold where polymerization and molding take place simultaneously.

The preferred catalyst component as taught by Klosiewicz is a tungsten halide, and preferably a mixture or complex of tungsten hexachloride ($WCl_6$) and tungsten oxytetrachloride ($WOCl_4$). The tungsten compound is not normally soluble in the cycloolefin, but can be solubilized by complexing it with a phenolic compound such as a phenol, alkyl phenol, halogenated phenol or phenolic salt.

U.S. Pat. No. 4,981,931 describes another metathesis catalyst system in which a tungsten halide catalyst having the formula $WX_n(OR)_{6-n}$ is used, where X is Cl or Br, n is 2 or 3 and R is a phenoxy group that can be substituted by Cl, a phenyl, 1–8 carbon alkoxy or 1–9 carbon alkyl group. Another tungsten halide catalyst is described in U.S. Pat. No. 5,082,909 and has the formula $WOCl_{4-x}(OAr)_x$, where Ar is a hindered phenyl ring and x is 1–3. These catalysts are both used in conjunction with a triphenyltin hydride or a trialkyltin hydride as an activator. U.S. Pat. No. 4,882,401 discloses the use of molybdenum or tungsten halide catalysts in combination with dialkylzinc compounds, alkylzinc halides or aromatic zinc compounds as activators.

In order to prevent premature ionic polymerization of the DCPD monomer in which the catalyst is typically dissolved, the catalyst component can be stabilized by reacting it with a chelating agent or Lewis base. Stabilizer compounds include, for example, diethyl ether, ethylene glycol dimethyl ether (glyme), bis(methoxy)ethyl ether (diglyme), benzonitrile, acetonitrile, and tetrahydrofuran. The stabilizers are not necessary when storage times are short.

The metathesis catalyst is typically activated with an alkylating agent such as, for example, an aluminum alkyl, alkyl tin hydride, magnesium dialkyl, lead alkyl or a silane. Once the catalyst is alkylated, it forms the active species, a tungsten or molybdenum carbene (alkylidene) compound.

Takagi et al. described the use of unsolvated Grignard reagents as activators for the metathesis of acyclic olefins in *T. J. Oil Chem. Soc.* Japan 1975, 24 (8), 518. No polymers were formed. The mechanism for the activation of the catalyst for the metathesis of acyclic olefins was described in J. Levisalles et al., *J. Organomet. Chem.* 1980, 192, 375. P. A. Raven and E. J. Wharton demonstrated that a mixture of $WCl_6$ in benzene and an ethereal Grignard reagent such as n-propylmagnesium bromide is active in disproportionating olefins (*Chemistry and Industry*, Apr. 1, 1972, 292). However, none of these references has disclosed the use of an ethereal Grignard reagent for activating the ring-opening metathesis of polycyclic polyolefins.

SUMMARY OF THE INVENTION

In a process for polymerizing a polycyclic cycloolefin wherein a plurality of liquid streams, at least one of which contains a polycyclic cycloolefin and a metathesis polymerization catalyst and at least one of which contains a metathesis polymerization catalyst activator are brought together and immediately injected into a mold where polymerization and molding take place simultaneously, the improvement comprises using as the activator a Grignard reagent having the formula RMgX, wherein R is an alkyl, cycloalkyl, cycloalkenyl or phenyl group and X is Cl, Br or I.

It is believed that the Grignard reagents of the present invention are efficient activators for metathesis polymerization catalysts and produce large amounts of active species. In addition, the amount of residual monomer is kept to a minimum. The length of the cure and gel times can be controlled by proper selection of the organic group in the Grignard reagent.

DETAILED DESCRIPTION OF THE INVENTION

The Grignard reagents used as the activators in the metathesis catalyst system of this invention are prepared by standard methods by reaction of an organic halide and magnesium turnings in diethyl ether. When the organic group is an alkyl group, any alkyl group can be used, regardless of chain length or degree of branching. In the formula given above, R can be, for example, methyl, ethyl, n-propyl, i-propyl, n-butyl, i-butyl, t-butyl, n-pentyl, n-hexyl, n-heptyl, n-octyl, n-nonyl, n-decyl, dicyclopentenyl, cyclopropyl, cyclobutyl, cyclopentyl, cyclohexyl or phenyl. Cyclopentyl, t-butyl, dicyclopentenyl and phenyl are the preferred R groups and X is preferably chlorine.

When the liquid streams containing the metathesis catalyst and the activator are combined, the resulting cycloolefin to catalyst ratio can be from about 500:1 to about 15,000:1 on a molar basis, preferably 2000:1. The Grignard activator compounds are typically used at a ratio of catalyst compound/activator ratio of from about 1:2 to about 1:4, although the invention is not limited to this range. The ratio depends upon the nature of the organic group in the Grignard reagent and can readily be determined by one skilled in the art.

It is possible to control the gel and cure times or the residual monomer content by choosing the correct R group for the Grignard reagent. For example, using ethylmagnesium chloride as the activator produces shorter gel and cure times than the other Grignard reagents, although the residual monomer content is higher. The lowest residual monomer content was obtained with cyclopentylmagnesium chloride and phenylmagnesium bromide, although gel and cure times were longer than when ethylmagnesium chloride was used. Longer gel and cure times would be desirable for molding large parts so that the monomer would not polymerize before the mold was filled. Shorter gel and cure times would be acceptable for molding smaller parts.

The activator compounds of this invention can be used in the polymerization of polycyclic cycloolefin monomers generally, and in particular, in the polymerization of such monomers in bulk, i.e., in the absence of solvent. Such monomers are sometimes referred to in the art as norbornene type monomers and include, for example, dicyclopentadiene, higher cyclopentadiene oligomers, norbornene, norbornadiene, 5-alkylidenenorbornenes, tetracyclododecene, tetracyclododecadiene, and adducts of these monomers with monocyclic cycloolefins, or substituted derivatives of these compounds. The preferred cyclic olefin monomer is dicyclopentadiene or a mixture of 1 to 99 mole % dicyclopentadiene with other polycyclic cycloolefins, preferably 75 to 99 mole % dicyclopentadiene.

The catalyst used can be the $WOCl_4/WCl_6$ metathesis catalyst described in U.S. Pat. No. 4,568,660. A more efficient catalyst is a tungsten compound of the formula $WOCl_x(OAr)_{4-x}$ or $WX_n(OR)_{6-n}$, where Ar is a hindered phenyl ring, x is 1-3, R is a substituted or unsubstituted phenyl ring, X is Cl or Br, and n is 2 or 3. These catalysts are described in more detail in U.S. Pat. No. 5,082,909, and U.S. Pat. No. 4,981,931, respectively. Use of the activators of this invention is not limited to these specific types of metathesis catalysts, however.

A variety of additives can be present during the metathesis polymerization to improve or maintain the properties of the molded articles that are formed. Suitable additives include fillers, pigments, light stabilizers and flame retardants. Reinforcing materials or fillers such as glass fibers, mica, carbon black, and wollastonite can improve the flexural modulus of the polymer.

The molded article prepared by the process of this invention typically contains an antioxidant. Preferably a phenolic or amine antioxidant is added prior to polymerization. Examples of suitable antioxidants include 2,6,-t-butyl-p-cresol; N,N-diphenyl-p-phenylenediamine, and tetrakis[methylene(3,5-di-t-butyl-4-hydroxycinnamate)]-methane.

In some embodiments of this invention, a preformed elastomer that is soluble in the reactant streams is added to the metathesis catalyst system in order to increase the impact strength of the polymer. The elastomer can be dissolved in one or more of the reactant streams in an amount from about 1 to about 15 weight percent, based on the weight of monomer. More than one elastomer can be added to a liquid stream, or different elastomers can be added to different streams. Suitable elastomers include natural rubber, butyl rubber, polyisoprene, polybutadiene, polyisobutylene, ethylene/propylene copolymer, styrene/butadiene/styrene triblock rubber, random styrene/butadiene rubber, styrene/isoprene/styrene triblock rubber, ethylene/propylene/diene terpolymers and nitrile rubbers. The amount of elastomer used is determined by its molecular weight and is limited by the viscosity of the resultant reactant streams. The resultant reactant streams containing elastomer cannot be so viscous that mixing is not possible. Although an elastomer can be dissolved in just one stream, it is usually desirable that all streams have similar viscosities.

In the following examples, the polymerizations were carried out in sparged 15×125 mm test tubes that were stoppered with rubber stopples secured with electrical cable ties. Disposable syringes and needles were flushed with dry purified nitrogen before use and used only once. The polymerizations were performed with a DCPD solution of the catalyst at a DCPD/W ratio of 2000/1. Two equivalents of diglyme per equivalent of tungsten were added to the solution. A thermocouple attached to a digital thermometer was inserted. The desired starting temperature of the DCPD/catalyst mixture was attained by heating with a heat block (60° C.±2). When the activator was added as a diethyl ether solution, the temperature dropped to the temperature indicated in the tables ($T_i$, °C.), but was then brought up to 60° C.±2 using the heat block. A stopwatch was started as the activator was injected. Mixing was accomplished by vigorous shaking. The gel time ($t_{gel}$, seconds) was taken as the time when the mixture ceased to flow readily upon inversion of the tube. The maximum temperature of the exotherm ($T_{max}$) as well as the cure time, i.e., the time required to reach the maximum temperature ($t_{max}$, seconds), were recorded.

The swell values were obtained by refluxing 5 g polymer samples in toluene for 16 hours, cooling and determining the percentage weight gain. The samples were dried overnight in an oven containing a nitrogen atmosphere at 125° C. and then weighed again. The gel values were calculated using the following formula: gel $(\%) = W_2/W_1 \times 100$, where $W_2$=weight of heated polymer and $W_1$=initial weight of the polymer. Low swell values indicate a high degree of crosslinking in the polymer.

Residual monomer was determined by extracting the monomer with toluene from a one gram sample of polymer. The solution was analyzed by gas chromatography and the amount of monomer quantified by comparing with dodecane as an internal standard.

The catalyst used in Examples 1-5 was prepared as follows. Cyclopentane was dried over 4A molecular sieves and sparged prior to use. A solution of 200 ml cyclopentane and 50 g tungsten oxytetrachloride ($WOCl_4$) was placed in a 500 ml round bottom flask. A solution of 53 g of 2,6-diisopropylphenol and 20 ml cyclopentane was added to the flask over a 30 minute period. The mixture was allowed to stir for an additional two hours. The cyclopentane was then removed under vacuum and the solid catalyst $WOCl_2$ (2,6-diisopropylphenoxy)$_2$ was stored in a container in an inert atmosphere dry box.

EXAMPLE 1

The cyclopentylmagnesium chloride used as the activator in this example was prepared by a standard Grignard reaction. A suspension of 21 g magnesium turnings in 200 ml diethyl ether was placed in a 500 ml round bottom flask. After ensuring the inertness of the atmosphere by sparging with dry nitrogen, a small crystal of iodine was added to activate the magnesium turnings. Cyclopentyl chloride (50 g) was added slowly with stirring. After the addition was complete, the solution was stirred an additional two hours. The solution was then filtered and the molarity was determined by titration. A series of polymerizations was performed varying the DCPD/W/G ratio (G=Grignard reagent) from 2000/1/1 to 2000/1/5. The polymerization data are recorded in Table 1.

TABLE 1

| G/W | $T_i$ (°C.) | $t_{gel}$ (sec) | $t_{max}$ (sec) | $T_{max}$ (°C.) | RM (%) | Gel (%) | Swell (%) |
|---|---|---|---|---|---|---|---|
| 1 | 52.0 | | 218 | 64.1 | | | |
| 2 | 51.0 | 73 | 172 | 211 | 0.1 | | |
| 3 | 50.5 | 35 | 94 | 207 | | 99 | 225 |
| 4 | 54.1 | 32 | 86 | 184 | 0.06 | 97 | 240 |
| 5 | 47.5 | 248 | 523 | 95.2 | 25.18 | 99 | 235 |

The data indicate that as the Grignard to tungsten ratio approached 4, the gel and cure times decreased to a minimum, while the residual monomer remained very low. At a Grignard to tungsten ratio of 2, the residual monomer was relatively low, while the gel and cure times were approximately double those obtained at a ratio of 4.

EXAMPLE 2

Tert-butylmagnesium chloride, prepared by a standard Grignard reaction, was used as the activator in this example. A series of polymerizations was performed varying the DCPD/W/G ratio from 2000/1/1 to 2000/1/5. The polymerization data are recorded in Table 2.

TABLE 2

| G/W | $T_i$ (°C.) | $t_{gel}$ (sec) | $t_{max}$ (sec) | $T_{max}$ (°C.) | RM (%) | Gel (%) | Swell (%) |
|---|---|---|---|---|---|---|---|
| 1 | 50.2 | 89 | 619 | 101.1 | 32.65 | 61 | 275 |
| 2 | 46.3 | 166 | 240 | 190.0 | 0.19 | 100 | 158 |
| 3 | 54.0 | 83 | 191 | 171.3 | 0.03 | >100 | 144 |
| 4 | 49.2 | 191 | 302 | 179.7 | 0.85 | 96 | 169 |
| 5 | 58.5 | 397 | 697 | 162.7 | 6.19 | 93 | 168 |

The data indicate that as the Grignard to tungsten ratio approached 3, the gel and cure times decreased to a minimum, while the residual monomer remained very low. At a Grignard to tungsten ratio of 2, the residual monomer was relatively low, while the gel and cure times were approximately double those obtained at a ratio of 3.

EXAMPLE 3

Phenylmagnesium bromide is used as the activator. A series of polymerizations was performed varying the DCPD/W/G ratio from 2000/1/1 to 2000/1/6. The polymerization data are recorded in Table 3.

TABLE 3

| G/W | $T_i$ (°C.) | $t_{gel}$ (sec) | $t_{max}$ (sec) | $T_{max}$ (°C.) | RM (%) | Gel (%) | Swell (%) |
|---|---|---|---|---|---|---|---|
| 1 | 50.6 | 213 | 1500 | 88.5 | 28.41 | 71 | 319 |
| 2 | 48.2 | 67 | 165 | 181.4 | 0.95 | 98 | 209 |
| 3 | 46.5 | 59 | 180 | 189.5 | 0.83 | 98 | 206 |
| 4 | 51.8 | 51 | 190 | 173.3 | 3.82 | 97 | 144 |
| 5 | 50.0 | 89 | 676 | 74.3 | 21.10 | 69 | 107 |
| 6 | 47.9 | 133 | 581 | 62.1 | 43.31 | | |

The data indicate that the gel and cure times were at a minimum and the residual monomer remained very low at Grignard to tungsten ratios of 2 and 3.

EXAMPLE 4

Ethylmagnesium chloride was used as the activator. A series of polymerizations was performed varying the DCPD/W/G ratio from 2000/1/2 to 2000/1/6. The polymerization data are recorded in Table 4.

TABLE 4

| G/W | $T_i$ (°C.) | $t_{gel}$ (sec) | $t_{max}$ (sec) | $T_{max}$ (°C.) | RM (%) | Gel (%) | Swell (%) |
|---|---|---|---|---|---|---|---|
| 2 | 44.8 | | 562 | 64 | | 45 | 431 |
| 3 | 50.3 | 13 | 17 | 167 | 43.61 | 99 | 193 |
| 4 | 50.4 | 22 | 436 | 140 | 2.30 | 93 | 216 |
| 5 | 44.7 | 20 | 225 | 157 | 11.91 | 92 | 206 |
| 6 | 48.8 | 15 | 155 | 168 | 3.01 | | |

It is evident that this activator is not as effective as the others under these conditions, since the minimum residual monomer content was 2.3% and it occurred at a Grignard to tungsten ratio of 4.

EXAMPLE 5

Dicyclopentadiene (140 ml) and 219 g concentrated HCl (38%) were added to a 1 liter round bottom flask equipped with a TEFLON ®-coated magnetic stir bar. A reflux condenser was connected to the flask. The apparatus was placed in an oil bath that was preheated to 70° C. and the solution was stirred for 5 hours. The contents of the flask was cooled and placed in a separatory funnel. The solution separated into two layers when distilled water (100 ml) was added to the separatory funnel. The green, opaque, organic bottom layer was retained. The organic layer was washed twice with 100 ml distilled water, 100 ml 0.1M KOH solution and 100 ml distilled water. The organic layer was dried over MgSO4 and filtered. A clear tan colored oil remained. The oil vacuum distilled at ≈10 Torr. The first 2-5 ml were discarded. The remainder was collected at 85° to 87° C. The yield of $C_{10}H_{13}Cl$ ((DCPD) (HCl)) was 92.1 g.

The $C_{10}H_{13}Cl$ was used to prepare a dicyclopentenyl magnesium chloride activator by a standard Grignard reaction. A series of polymerizations was performed varying the DCPD/W/G ratio from 2000/1/1 to 2000/1/5. The polymerization data are recorded in Table 5.

TABLE 5

| G/W | $T_i$ °C. | $t_{gel}$ (sec) | $t_{max}$ (sec) | $T_{max}$ (°C.) | Gel (%) | Swell (%) | RM (%) |
|---|---|---|---|---|---|---|---|
| 1 | 33 | 42 | 79 | 193 | 106 | 159 | 1.34 |
| 2 | 36 | 58 | 90 | 204 | 100 | 204 | 0.10 |
| 3 | 34 | 64 | 123 | 188 | 103 | 180 | 0.08 |
| 4 | 35 | 212 | 325 | 175 | 79 | 480 | 0.06 |
| 5 | 35 | 291 | 347 | 165 | 86 | 473 | 0.07 |

EXAMPLE 6

The tungsten catalyst $WCl_4(OC_6H_3\text{-}2,6\text{-}iPr_2)_2$ was prepared in the following manner. A solution of 150 ml pentane and 50 g tungsten hexachloride (WCl6) was placed in a 500 ml round bottom flask. A solution of 47 g 2,6-diisopropylphenol and 20 ml cyclopentane was added to the flask over a 30 minute period. The mixture was allowed to stir for an additional two hours. The pentane was then removed under vacuum and the solid catalyst was stored in a container in a inert atmosphere dry box.

A cyclopentylmagnesium chloride activator was prepared from cyclopentyl chloride and magnesium turnings in diethyl ether by a standard Grignard reaction. A series of polymerizations was performed using the $WCl_4(OC_6H_3\text{-}2,6\text{-diisopropylphenoxy})_2$ catalyst. The DCPD/W/G ratio was varied from 2000/1/1 to 2000/1/4. The polymerization data are listed in Table 6.

TABLE 6

| G/W | $T_i$ °C. | $t_{gel}$ (sec) | $t_{max}$ (sec) | $T_{max}$ (°C.) | Gel (%) | Swell (%) | RM (%) |
|---|---|---|---|---|---|---|---|
| 1 | 53.1 | 59 | 79 | 166 | 94 | 114 | >10 |
| 2 | 55.2 | 97 | 179 | 203 | 102 | 144 | 0.45 |
| 3 | 53.1 | 212 | 336 | 195 | 99 | 162 | 1.6 |
| 4 | 54.2 | 196 | — | 76 | 79 | 220 | >10 |

The data indicate that the residual monomer content (RM) was at a minimum at a Grignard to tungsten ratio of 2.

I claim:

1. In a process for polymerizing a polycyclic cycloolefin wherein a plurality of liquid streams, at least one of which contains a polycyclic cycloolefin and a metathesis polymerization catalyst and at least one of which contains a metathesis polymerization catalyst activator are brought together and immediately injected into a mold where polymerization and molding take place simultaneously, the improvement comprising using as the activator a Grignard reagent having the formula RMgX where R is a cycloalkyl or cycloalkenyl group and X is Cl, Br or I.

2. The process of claim 1 wherein the mole ratio of catalyst to Grignard activator is from about 1:2 to about 1:4.

3. The process of claim 2 wherein the Grignard reagent is cyclopentylmagnesium chloride.

4. The process of claim 1 wherein the mole ratio of catalyst to Grignard activator is from about 1:2 to about 1:5.

5. The process of claim 4 wherein the Grignard reagent is dicyclopentenylmagnesium chloride.

* * * * *